US009639491B2

(12) United States Patent
Chang

(10) Patent No.: US 9,639,491 B2
(45) Date of Patent: May 2, 2017

(54) CONNECTION INTERFACE SWITCHING DEVICE FOR MULTIPLE PORTABLE DEVICES

(71) Applicant: GOOD WAY TECHNOLOGY CO., LTD., New Taipei (TW)

(72) Inventor: Yi-Cheng Chang, Taipei (TW)

(73) Assignee: GOOD WAY TECHNOLOGY CO., LTD. (TW)

( * ) Notice: Subject to any disclaimer, the term of this patent is extended or adjusted under 35 U.S.C. 154(b) by 325 days.

(21) Appl. No.: 14/325,441

(22) Filed: Jul. 8, 2014

(65) Prior Publication Data
US 2016/0012001 A1    Jan. 14, 2016

(51) Int. Cl.
G06F 13/40    (2006.01)
G06F 13/42    (2006.01)

(52) U.S. Cl.
CPC ...... G06F 13/4022 (2013.01); G06F 13/4221 (2013.01)

(58) Field of Classification Search
CPC .................. G06F 13/4221; G06F 13/4022
See application file for complete search history.

(56) References Cited

U.S. PATENT DOCUMENTS

| 2009/0024847 A1* | 1/2009 | Sun ................. G06F 21/6209 713/165 |
| 2010/0049889 A1* | 2/2010 | Sato ..................... G06F 3/023 710/67 |
| 2011/0040921 A1* | 2/2011 | Chou .................. G06F 3/023 710/316 |
| 2011/0173355 A1* | 7/2011 | Charna ............. G06F 3/0238 710/67 |
| 2012/0159651 A1* | 6/2012 | Beacham ........... G06F 3/023 726/34 |

* cited by examiner

Primary Examiner — Nimesh G Patel
(74) Attorney, Agent, or Firm — Schmeiser, Olsen & Watts, LLP

(57) ABSTRACT

A connection interface switching device for multiple portable devices provides a communication channel between an I/O peripheral set and for a plurality of portable devices which are bundled with a default control program installed in the portable devices, and switches among the portable devices to establish a communication channel selected between one portable device and the I/O peripheral set according to a switch instruction generated by the default control program of the portable device. The connection interface switching device includes plural I/O ports, a controller, a memory module, a storage module and an I/O peripheral port, and an origin of the computer signal is controlled and switched to achieve the effect of sharing the same I/O peripheral set among multiple portable devices through the communication channel.

10 Claims, 2 Drawing Sheets

CONNECTION INTERFACE SWITCHING DEVICE FOR MULTIPLE PORTABLE DEVICES

FIELD OF THE TECHNOLOGY

The present invention relates to a connection interface switching device, in particular to the connection interface switching device for multiple portable devices such as a portable electronic device or a notebook computer.

BACKGROUND

In general, a switch is used for connecting a set of input/output (I/O) devices to manage a plurality of personal computer effectively, so that the personal computers can share a set of keyboard, mouse and display device. The conventional switch has different types of ports (such as a plurality of keyboard/mouse ports and a plurality of video input ports) disposed at an end of the switch for connecting a multiple of personal computers simultaneously; and a plurality of input/output (I/O) ports disposed at the other end of the switch for connecting to a set of computer peripherals such as the keyboard, mouse and display device. With the aforementioned switch, users can select one of the personal computers and control the personal computer through the computer peripheral.

However, the conventional switch and the personal computer are connected through each port corresponding to the personal computer. For example, a video output port of a personal computer is connected to a video input port of the switch, and keyboard/mouse port of the personal computer is connected to the keyboard/mouse port of the switch, and such one-to-one connection of all ports requires a large quantity of connection wires, not only increasing the material cost, but also requiring a complicated field application.

In addition, the ports of the computer come with different specifications as the technologies and requirements change, and the conventional switch cannot be used anymore if the specification of the computer port is updated or changed, and thus wasting equipment investments. Furthermore, only one screen input or switching is usually provided between the display device port of the computer and the switch, which hardly can meet the multi-screen output and switching requirement.

SUMMARY

In view of the aforementioned drawbacks, the inventor of the present invention based on years of experience in the related industry to conduct extensive researches and experiments, and finally developed a connection interface switching device in accordance with the present invention to overcome the drawbacks of the prior art.

Therefore, it is a primary objective of the invention to simplify the connection wires between portable devices and the switch.

Another objective of the present invention is to provide a plurality of portable devices that can be switched to share the same I/O peripheral.

A further objective of the present invention is to provide a plurality of video output ports to meet the multi-screen output requirement of the portable device.

A further objective of the present invention is to provide a plurality of I/O ports provided for the portable device to connect a plurality of I/O hardware peripherals.

To achieve the aforementioned and other objectives, the present invention provides a connection interface switching device for multiple portable device, the connection interface switching device provides a communication channel to a plurality of portable device bundled with a default control program, and the communication channel is established between the portable device and an I/O peripheral set, so that the corresponding portable device can be controlled and operated by the communication channel and outputs signals through the communication channel output signal. The connection interface switching device switches among the portable device to establish a communication channel selected between the portable devices and the I/O peripheral set according to a switch instruction generated by the portable device through the default control program, and the plurality of portable devices can share the same I/O peripherals by the switching method. Wherein, the connection interface switching device comprises: a plurality of I/O ports, a controller, a memory module, a storage module and an I/O peripheral port. The I/O ports are provided for connecting each portable device to the corresponding I/O port through a single I/O connection line. The controller is coupled to the I/O ports, for receiving a signal transmitted by the currently selected I/O port, acknowledging the switch instruction, and switching the currently selected I/O port to another I/O port to provide the communication channel to a corresponding portable device coupled to the other I/O port. The memory module is coupled to the controller, for providing a buffer space required by the controller during the operation of the communication channel. The storage module is coupled to the controller, for storing an identification rule and a switching rule which are provided for the controller to switch the I/O ports. The I/O peripheral port is provided for connecting at least one external control device and at least one external display device to the communication channel.

In a preferred embodiment of the present invention, the I/O peripheral port comprises a plurality of video output ports and a plurality of I/O control ports. The video output ports are coupled to the controller for receiving a video output signal outputted by the controller and providing the video output signal to the at least one external display device. The I/O control ports are provided for connecting the at least one external control device, such that the I/O port selected by controlling the communication channel is corresponsive to the connected portable device. Wherein, the at least one external control device is a keyboard or a pointing device. Wherein, one of the I/O control ports is provided for connecting an external speaker to produce a sound effect according to an audio signal outputted by the controller, and each video output port is a video graphic array (VGA) port, a digital video interface (DVI) port, or a high definition multimedia interface port, or a DisplayPort (DP).

In a preferred embodiment of the present invention, the switching rule sets the controller to switch to the next I/O port based on the arrangement order of the I/O ports upon the receipt of the switch instruction each time. On the other hand, the switching rule further sets the controller to switch to a specified I/O port based on a default order matched with the default control program upon the receipt of the switch instruction according to a designated code given by the default control program.

In a preferred embodiment of the present invention, the controller is provided for processing the output signal to generate an audio signal which is provided to the I/O control ports and the I/O control port connected to an external speaker.

In a preferred embodiment of the present invention, the I/O port is a universal serial bus (USB), a mini universal serial bus (mini-USB), or a micro universal serial bus (micro-USB) port.

In a preferred embodiment of the present invention, if the portable device connected to the I/O port is a Smartphone or a tablet PC, the operating system bundled with the Smartphone or the tablet PC provides a video signal to transmit an output procedure in a universal serial bus (USB) format provided to the default control program bundled in the Smartphone or the tablet PC as a video signal provided to the controller.

Therefore, the connection interface switching device of the present invention is operated with the controller of the connection interface switching device through the default control program preinstalled in each portable device, so that users can set a hot key to perform a sequential switching (according to the arrangement sequence of the I/O ports) or a specific switching (switching to a specific I/O port) directly through the default control program, and each portable device can share the same I/O hardware peripheral simply through a single I/O connection line by the switching method. With the communication channel provided by the connection interface switching device of the present invention, each portable device can use the output of multiple screens to achieve the effects of simplifying and reducing wires and allowing the multiple portable devices to share an I/O peripheral set.

DETAILED DESCRIPTION OF THE PREFERRED EMBODIMENTS

The objects, characteristics and effects of the present invention will become apparent with the detailed description of the preferred embodiments and the illustration of related drawings as follows.

Figure 1:
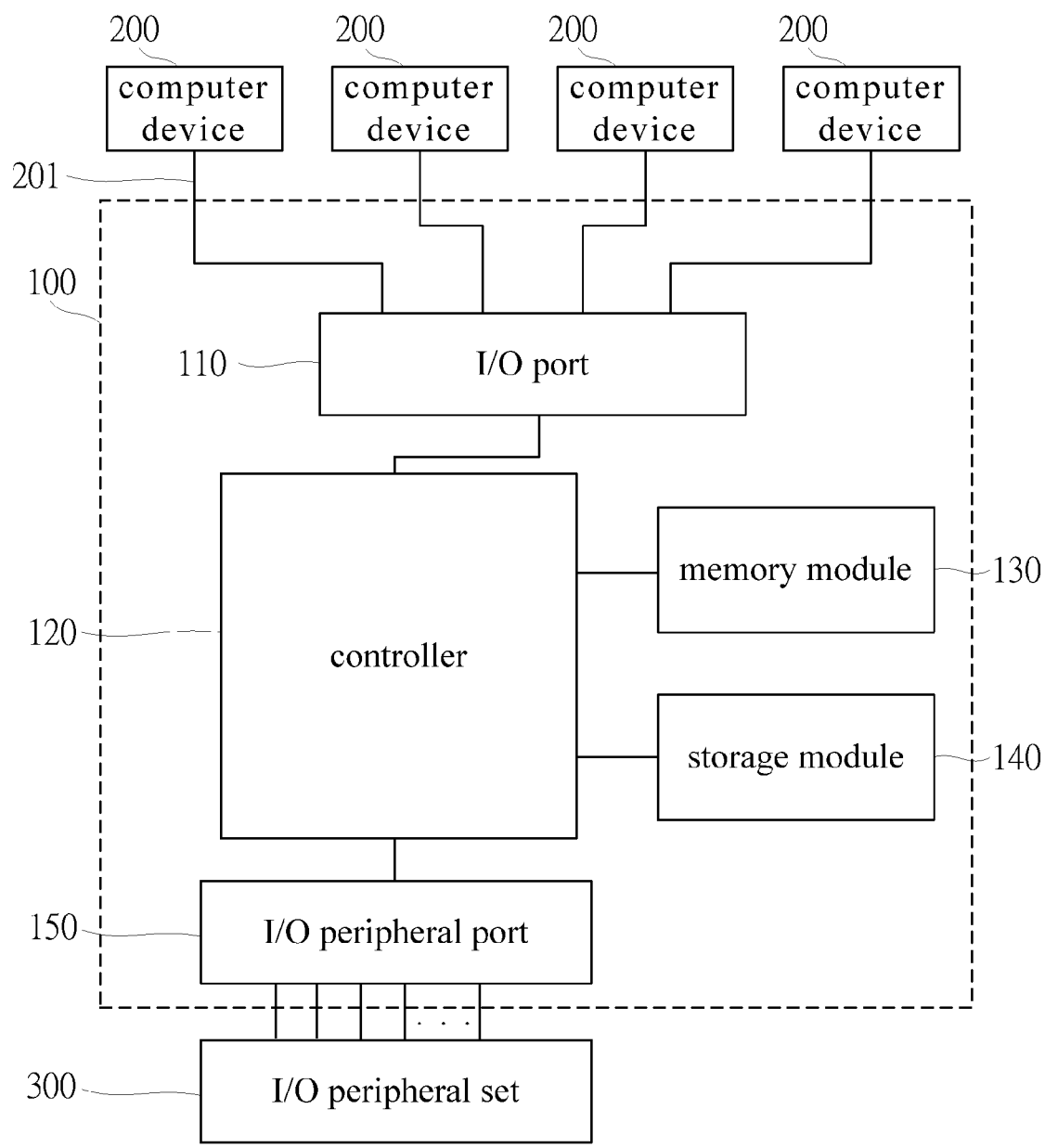
FIG. 1 is a functional block diagram of a connection interface switching device for multiple portable devices in accordance with a preferred embodiment of the present invention.

With reference to FIG. 1 for a functional block diagram of a connection interface switching device for multiple portable devices in accordance with a preferred embodiment of the present invention, a default control program is pre-installed in a portable device 200, so that instructions and data can be transmitted between the portable device 200 and the connection interface switching device 100. The default control program is provided for controlling a control layer of an external I/O peripheral in an operating system installed in the portable device 200, and the connection interface switching device 100 can simulate an acknowledge signal required for connecting the I/O peripheral to the portable device 200 directly, so that the operating system of the portable device 200 considers the connection interface switching device 100 as the external I/O peripheral, and thus a communication channel is established between the portable devices 200 and the I/O peripheral set 300 by the connection interface switching device 100, and the portable devices 200 can be controlled and operated by the I/O peripheral set 300 to output signals (including the video signals, audio signals, etc) to the I/O peripheral set 300.

In addition, the connection interface switching device 100 duplicates and converts a signal received by the portable device 200, and the signal is transmitted to the external I/O peripheral set 300, and the input signal of the I/O peripheral set 300 is transmitted to the corresponding portable device 200. With the default control program, each portable device 200 is coupled to the connection interface switching device 100 through a single I/O connection wire 201 for transmitting and receiving one format of signals in the process of controlling the portable device 200, and allowing the multiple portable devices 200 to share the single I/O peripheral set 300, so as to further enhance the expandability of the portable device 200 (wherein the I/O peripheral set 300 is a keyboard, a mouse, a flash drive, a card reader, a speaker, a display device, or a network device).

In a preferred embodiment of the present invention, the portable device 200 is a notebook computer, a Smartphone or a tablet PC. Wherein, tablet PC and the notebook computer are IBM compatible computer or Macintosh computer bundled with an operating system such as Windows, Mac OS, Unix or Linux, and the Smartphone and tablet PC are a Smartphone (such as iphone) or a tablet PC (such as ipad) bundled with an operating system such as Windows mobile, Mac iOS, Android, Firefox or Linux.

With reference to FIG. 1 for a connection interface switching device for multiple portable devices in accordance with a preferred embodiment of the present invention, the connection interface switching device comprises a plurality of I/O ports 110, a controller 120, a memory module 130, a storage module 140 and an I/O peripheral port 150.

Each I/O port 110 is provided for connecting each corresponding portable device 200 through a single I/O connection wire 201 to receive a signal (such as a switch instruction, a video signal, an audio signal, etc) outputted by the portable device 200 and transmit the signal to the corresponding portable device 200 (In other words, a user operates an I/O peripheral to generate a signal, and the signal is transmitted through the I/O port 110 to the portable device 200). In the present invention, each I/O port 110 is a universal serial bus (USB) port, a mini universal serial bus (mini-USB) port or a micro universal serial bus (micro-USB) port. In other words, the portable device 200 is coupled to the connection interface switching device through the USB interface, and various types of signals are transmitted through the USB interface, and the I/O connection wire 201 is a transmission wire in compliance with the USB interface specification.

The controller 120 is coupled to the I/O ports 110, and the signal transmission circuit is coupled to the controller 120. The controller 120 is coupled to the I/O ports 110 for receiving a signal currently selected to be transmitted by I/O port 110. If the controller 130 has received a switch instruction outputted by the portable device 200 corresponding to the currently selected I/O port 110, the switch instruction is acknowledged and the currently selected I/O port 110 is switched to an other I/O port 110, and the communication channel is provided to the portable device 200 corresponding to the other I/O port 110 to complete the switching operation. In other words, the controller 110 is changed to receive signals transmitted from the other I/O port 110 after the switching operation takes place.

In a preferred embodiment, the controller 120 switches the I/O port 110 to the next I/O port 110 according to the arrangement order of the I/O ports 110, when the controller 120 has received the switch instruction for each time. In other words, with the established communication channel, a user can perform a hot key operation through an I/O device (such as a keyboard 321 as shown in FIG. 2) and the hot key operation signal is transmitted through the I/O port 110 to the corresponding portable device 200, so that if the default control program installed in the portable device 200 receives the hot key operation signal, the switch instruction will be generated, and transmitted through the I/O port 110 to the controller 120, and then the controller 120 will selectively switch the I/O ports 110.

In another preferred embodiment, the controller 120 switches the I/O ports 110 according to a default order. The default order is matched with the default control program. In other words, the switch instruction generated by the default control program includes a designation code for informing the controller 120 to switch to which I/O port 110, so that when the controller 120 receives the switch instruction, the controller 120 can switch to a specific I/O port according to the designation code given by the default control program.

The memory module 130 is coupled to the controller 120, for providing a buffer space required by the controller 120 during the operation of the communication channel. The storage module 140 is coupled to the controller 120 for storing an identification rule and a switching rule which are provided for the controller 120 to switch the I/O ports 110. The I/O peripheral port 150 is provided for connecting at least one external control device (321, 322, and/or 323 of FIG. 2) and at least one external display device (320 of FIG. 2) to the communication channel.

Figure 2:
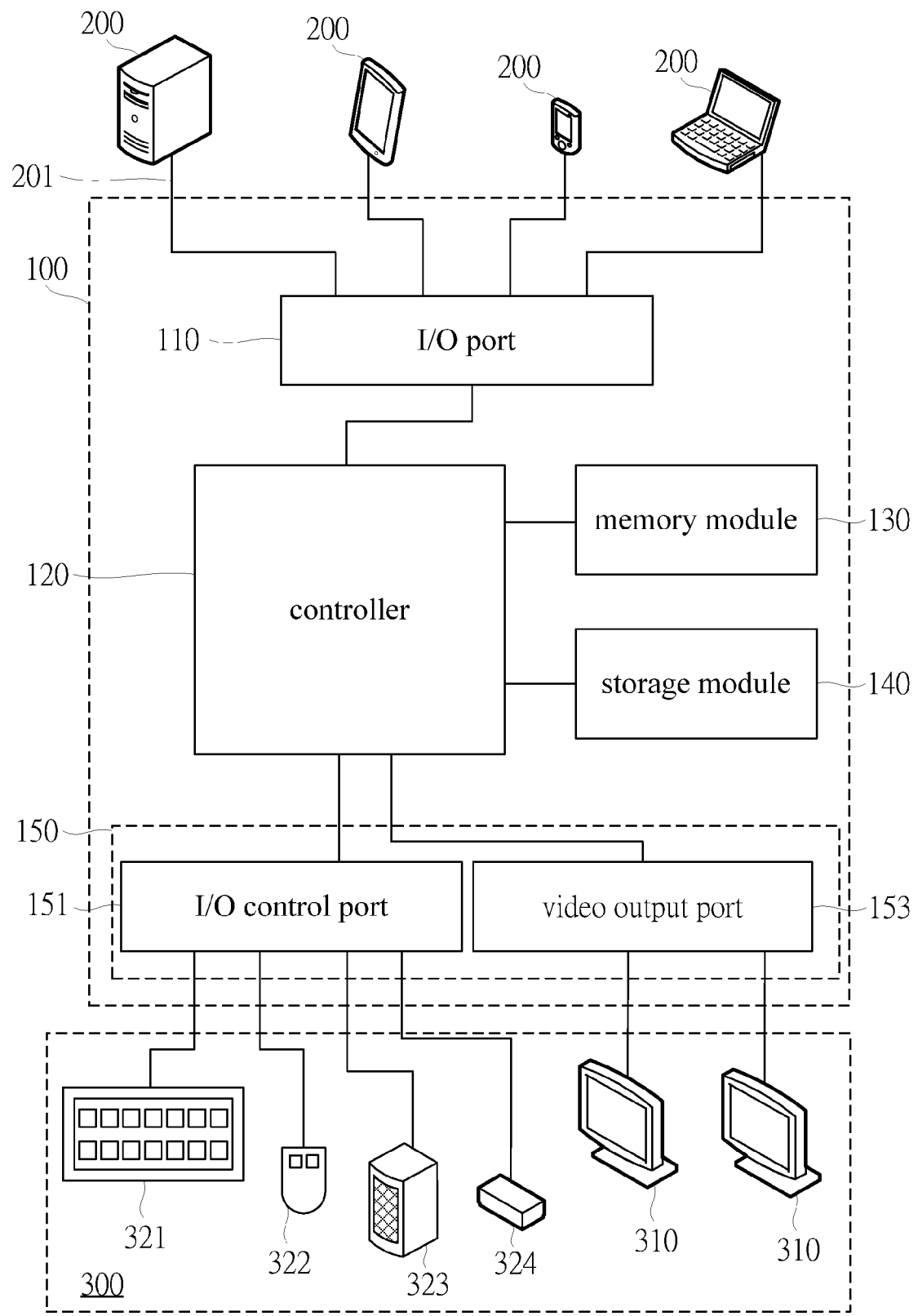
FIG. 2 is a schematic view showing an external peripheral in accordance with a preferred embodiment of the present invention.

With reference to FIG. 2 for a schematic view of an external peripheral in accordance with a preferred embodiment of the present invention. The I/O peripheral port 150 comprises a plurality of video output ports 153 and a plurality of I/O control ports 151. Each video output port 153 is connected to the controller 120 for receiving a video output signal processed by the controller 120 and transmitting the video output signal to the display device 310. Wherein, the video output port 153 is an output port in compliance with the video graphic array (VGA) interface, digital video interface (DVI) or high definition multimedia interface (HDMI) or DisplayPort (DP) specification.

The I/O control ports 151 are provided for connecting a plurality of input devices (321~322), such that the connected controller 120 provides the corresponding input signal to the portable device 200 corresponding to the I/O port 110 selected by the controller 120. In addition, the peripherals connected to the I/O control ports 151 include a keyboard 321, a mouse 322, a speaker 323 and a network device 324 (such as the RJ-45 I/O control port). Wherein, the I/O control ports connected to the keyboard 321 and the mouse 322 are ports in compliance with the universal serial bus (USB) interface specification.

If the portable device 200 connected to the I/O port 110 is a Smartphone or a tablet PC, the operating system bundled in the Smartphone or the tablet PC provides an output procedure for transmitting the video signal in a universal serial bus (USB) format, and the default control program bundled in the Smartphone or the tablet PC processes the video signal and sends the video signal to the controller 120.

In summation of the description above, the connection interface switching device 100 of the present invention is operated together with the controller 120 installed in the connection interface switching device through a default control program pre-installed in each portable device 200, such that each portable device 200 can form a communication channel with the controller 120 and a peripheral coupled to the I/O peripheral port 150 through a single I/O connection wire (such as a USB transmission line), and the controller 120 is provided for switching the communication channel and using the communication channel for controlling the transmission of a packet including a video packet and an audio packet to reduce the use of wires significantly, so as to achieve the effect for the multiple portable devices to share the same I/O peripheral.

While the invention has been described by means of specific embodiments, numerous modifications and variations could be made thereto by those skilled in the art without departing from the scope and spirit of the invention set forth in the claims.

What is claimed is:

1. A connection interface switching device for multiple portable devices, capable of providing a communication channel for an I/O peripheral set for a plurality of portable devices bundled with a default control program, and switching among the portable devices to establish a communication channel selected between the portable devices and the I/O peripheral set according to a switch instruction generated by the portable device through the default control program, and the connection interface switching device comprising:
    a plurality of I/O ports, for connecting each portable device to the corresponding I/O port through a single I/O connection wire;
    a controller, coupled to the I/O ports, for receiving a signal transmitted by the currently selected I/O port, acknowledging the switch instruction, and switching the currently selected I/O port to another I/O port to provide the communication channel to a corresponding portable device coupled to the other I/O port;
    a memory module, coupled to the controller, for providing a buffer space required by the controller during the operation of the communication channel;
    a storage module, coupled to the controller, for storing an identification rule and a switching rule which are provided for the controller to switch the I/O ports; and
    an I/O peripheral port, for connecting at least one external control device and at least one external display device to the communication channel.

2. The connection interface switching device of claim 1, wherein the I/O peripheral port comprises:
    a plurality of video output ports, coupled to the controller, for receiving a video output signal outputted by the controller and providing the video output signal to the at least one external display device; and
    a plurality of I/O control ports, for connecting the at least one external control device, such that the I/O port selected by controlling the communication channel is corresponsive to the connected portable device.

3. The connection interface switching device of claim 2, wherein the at least one external control device is one selected from the group consisting of a keyboard and a pointing device.

4. The connection interface switching device of claim 3, wherein one of the I/O control ports is provided for connecting an external speaker to produce a sound effect according to an audio signal outputted by the controller.

5. The connection interface switching device of claim 3, wherein one of the I/O control ports is a network port.

6. The connection interface switching device of claim 2, wherein each video output port is one selected from the group consisting of a video graphic array (VGA) port, a digital video interface (DVI) port, DisplayPort (DP) and a high definition multimedia (HDMI) interface port.

7. The connection interface switching device of claim 1, wherein the switching rule sets the controller to switch to the next I/O port based on the arrangement order of the I/O ports upon the receipt of the switch instruction each time.

8. The connection interface switching device of claim 1, wherein the switching rule sets the controller to switch to a specified I/O port based on a default order matched with the default control program upon the receipt of the switch instruction according to a designated code given by the default control program.

9. The connection interface switching device of claim 1, wherein the I/O port is a universal serial bus (USB), a mini universal serial bus (mini-USB), or a micro universal serial bus (micro-USB) port.

10. The connection interface switching device of claim 9, wherein if the portable device connected to the I/O port is a Smartphone or a tablet PC, the operating system bundled with the Smartphone or the tablet PC provides a video signal to transmit an output packet in a universal serial bus (USB) format provided from the default control program bundled in the Smartphone or the tablet PC as a video/audio/Ethernet or other USB packet provided to the controller.

* * * * *